United States Patent
Ono et al.

(10) Patent No.: US 10,836,302 B2
(45) Date of Patent: Nov. 17, 2020

(54) VEHICLE LAMP

(71) Applicant: STANLEY ELECTRIC CO., LTD., Tokyo (JP)

(72) Inventors: Masayuki Ono, Tokyo (JP); Tomoharu Sonoda, Tokyo (JP); Yasuyuki Tani, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 16/748,478

(22) Filed: Jan. 21, 2020

(65) Prior Publication Data

US 2020/0238891 A1 Jul. 30, 2020

(30) Foreign Application Priority Data

Jan. 24, 2019 (JP) .................... 2019-010153

(51) Int. Cl.
| | | |
|---|---|---|
| *B60Q 1/04* | (2006.01) | |
| *B60Q 1/00* | (2006.01) | |
| *B60Q 1/26* | (2006.01) | |
| *F21S 41/141* | (2018.01) | |

(52) U.S. Cl.
CPC ......... *B60Q 1/0441* (2013.01); *B60Q 1/0088* (2013.01); *B60Q 1/2623* (2013.01); *F21S 41/141* (2018.01)

(58) Field of Classification Search
CPC ............................. B60Q 1/0088; F21S 41/141
See application file for complete search history.

(56) References Cited

U.S. PATENT DOCUMENTS

| | | | | |
|---|---|---|---|---|
| 4,709,305 | A * | 11/1987 | McMahan ............ | B60Q 1/0088 362/267 |
| 6,319,045 | B1 * | 11/2001 | Sawayanagi ........... | B60K 37/02 439/374 |
| 7,476,014 | B1 * | 1/2009 | McCarthy .............. | H01R 33/09 362/519 |
| 7,726,980 | B1 * | 6/2010 | Wang ................... | B60Q 1/0088 439/76.1 |
| 2010/0085770 | A1 * | 4/2010 | Matsunaga .......... | H01R 13/516 362/546 |
| 2016/0091164 | A1 * | 3/2016 | Mornet .................... | H05K 1/11 362/547 |
| 2016/0121782 | A1 * | 5/2016 | Soenen ................. | F21S 43/249 362/511 |

(Continued)

FOREIGN PATENT DOCUMENTS

JP          H05-124468 A          5/1993

*Primary Examiner* — Alexander K Garlen
(74) *Attorney, Agent, or Firm* — Kenealy Vaidya LLP

(57) ABSTRACT

A vehicle lamp is a vehicle lamp having a light source unit configured to radiate light forward and disposed inside of a lighting body constituted by a housing having an opened front surface and a lens cover that covers the opening of the housing, the light source unit includes a circuit board to which a female connector is attached, and a wiring cord to which a male connector is attached, and the housing includes a restricting section that serves as a stopper of the male connector at a position facing an end portion of the male connector on a side opposite to the male connector in an insertion direction of the male connector in a state in which the male connector is inserted into the female connector.

7 Claims, 6 Drawing Sheets

(56) References Cited

U.S. PATENT DOCUMENTS

| | | | |
|---|---|---|---|
| 2016/0167604 A1* | 6/2016 | Aida | F21V 23/023 |
| | | | 362/546 |
| 2016/0298818 A1* | 10/2016 | Duarte | F21S 41/141 |
| 2018/0087761 A1* | 3/2018 | Dorn | F21V 23/001 |
| 2019/0093851 A1* | 3/2019 | Johnson | F21S 41/143 |
| 2019/0140377 A1* | 5/2019 | Roth | H01R 12/7029 |

\* cited by examiner

VEHICLE LAMP

CROSS-REFERENCE TO RELATED APPLICATION

Priority is claimed on Japanese Patent Application No. 2019-010153, filed Jan. 24, 2019, the content of which is incorporated herein by reference.

BACKGROUND OF THE INVENTION

Field of the Invention

The present invention relates to a vehicle lamp.

Description of Related Art

In recent years, in vehicle lamps mounted on vehicles, LED light sources have increasingly been employed according to an improvement of the brightness of light emitting diodes (LEDs) and the reduction of costs thereof. LEDs have advantages such as having a long lifetime and low power consumption. Meanwhile, since the luminous efficiency thereof decreases and the lifetime is shortened at high temperatures, it is necessary to efficiently dissipate the heat generated by an LED to the outside.

Here, in a vehicle lamp using an LED as a light source, a mounting board on which an LED is mounted and a circuit board on which a driving circuit configured to drive the LED is provided are separately disposed inside a lighting body, the mounting board and the circuit board are electrically connected to each other via a wiring cord, and the driving circuit is protected from the heat generated by the LED.

In addition, in a vehicle lamp, the circuit board and the wiring cord may be electrically connected by inserting a male connector attached to the wiring cord into a female connector attached to the circuit board (for example, see Japanese Unexamined Patent Application, First Publication No. H05-124468).

SUMMARY OF THE INVENTION

Incidentally, when the male connector is not properly inserted into the above-mentioned female connector, the male connector may move in a direction in which the male connector comes out of the female connector due to vibrations, impacts, or the like, during traveling of the vehicle. In this case, electrical connection (conduction) between the female connector and the male connector may not be maintained, the male connector may fall out of the female connector, and there is a concern that the LED may not light up.

In addition, when the wiring cord is moved due to vibrations, impacts, or the like, during traveling of the vehicle, the male connector is more likely to fall out of the female connector. Further, the attachment portion may be damaged due to application of a load to the attachment portion of the female connector attached to the circuit board.

An aspect of the present invention is directed to providing a vehicle lamp capable of maintaining electrical connection between a female connector and a male connector while preventing the male connector from falling out of the female connector.

In order to accomplish the above-mentioned objects, the present invention provides the following means.

[1] A vehicle lamp having a light source unit that is configured to radiate light forward and that is disposed inside of a lighting body constituted by a housing having an opened front surface and a lens cover that covers the opening of the housing, wherein the light source unit includes a circuit board to which a female connector is attached, and a wiring cord to which a male connector is attached, and the housing includes a restricting section that serves as a stopper for the male connector at a position facing an end portion of the male connector on a side opposite to the male connector in an insertion direction of the male connector in a state in which the male connector is inserted into the female connector.

[2] The vehicle lamp according to the above-mentioned [1], wherein the restricting section is a portion that abuts the end portion of the male connector and restricts movement of the male connector when the male connector is moved in a direction opposite to the insertion direction, and the restricting section is separately disposed from the end portion of the male connector within a range in which electrical connection between the female connector and the male connector is maintained.

[3] The vehicle lamp according to the above-mentioned [2], includes a retainer that is attached to an end portion of the male connector at an opposite side of the insertion direction of the male connector, and the restricting section is separately disposed from the retainer within a range in which electrical connection between the female connector and the male connector is maintained.

[4] The vehicle lamp according to any one of the above-mentioned [1] to [3], wherein the male connector has a larger number of terminals than a number of the wiring cords, and the restricting section is provided at a position facing the terminal that is not connected to the wiring cord of the male connector.

[5] The vehicle lamp according to any one of the above-mentioned [1] to [4], comprising a bracket disposed inside the lighting body, wherein the bracket has a clamp section that holds the wiring cord, the wiring cord is disposed while being bent between the male connector and the clamp section, and the restricting section is disposed with respect to the wiring cord at a side opposite to a side at which the wiring cord is bent.

[6] The vehicle lamp according to the above-mentioned [5], includes a binding member configured to bind the wiring cords, and the clamp section maintains a position of the wiring cord bound by the binding member.

[7] The vehicle lamp according to any one of the above-mentioned [1] to [6], wherein the insertion direction of the male connector is a direction from a lower side toward an upper side of the lighting body.

In this way, according to the aspect of the present invention, it is possible to provide a vehicle lamp capable of maintaining electrical connection between a female connector and a male connector while preventing the male connector from falling out of the female connector.

DETAILED DESCRIPTION OF THE INVENTION

Figure 1:
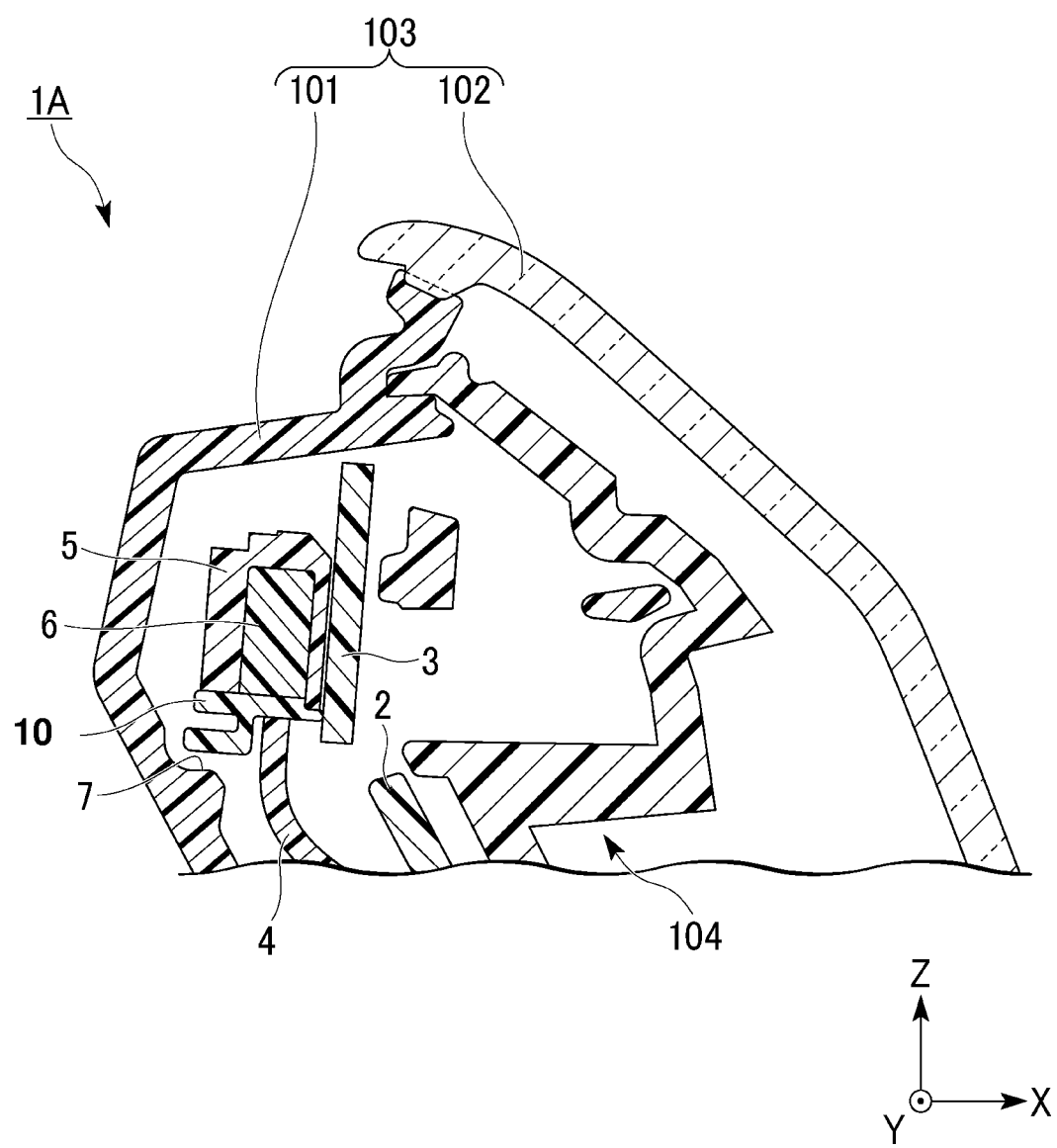
FIG. 1 is a cross-sectional view showing a configuration of a vehicle lamp according to a first embodiment of the present invention.

Hereinafter, embodiments of the present invention will be described in detail with reference to the accompanying drawings.

Further, in the drawings used in the following description, in order to make components easier to see, dimension scales may be different depending on the components, and dimensional ratios of the components are not always the same as the actual ones.

First Embodiment

First, for example, a lighting tool 1A for a vehicle shown in FIG. 1 to FIG. 4 will be described as a first embodiment of the present invention.

Figure 2:
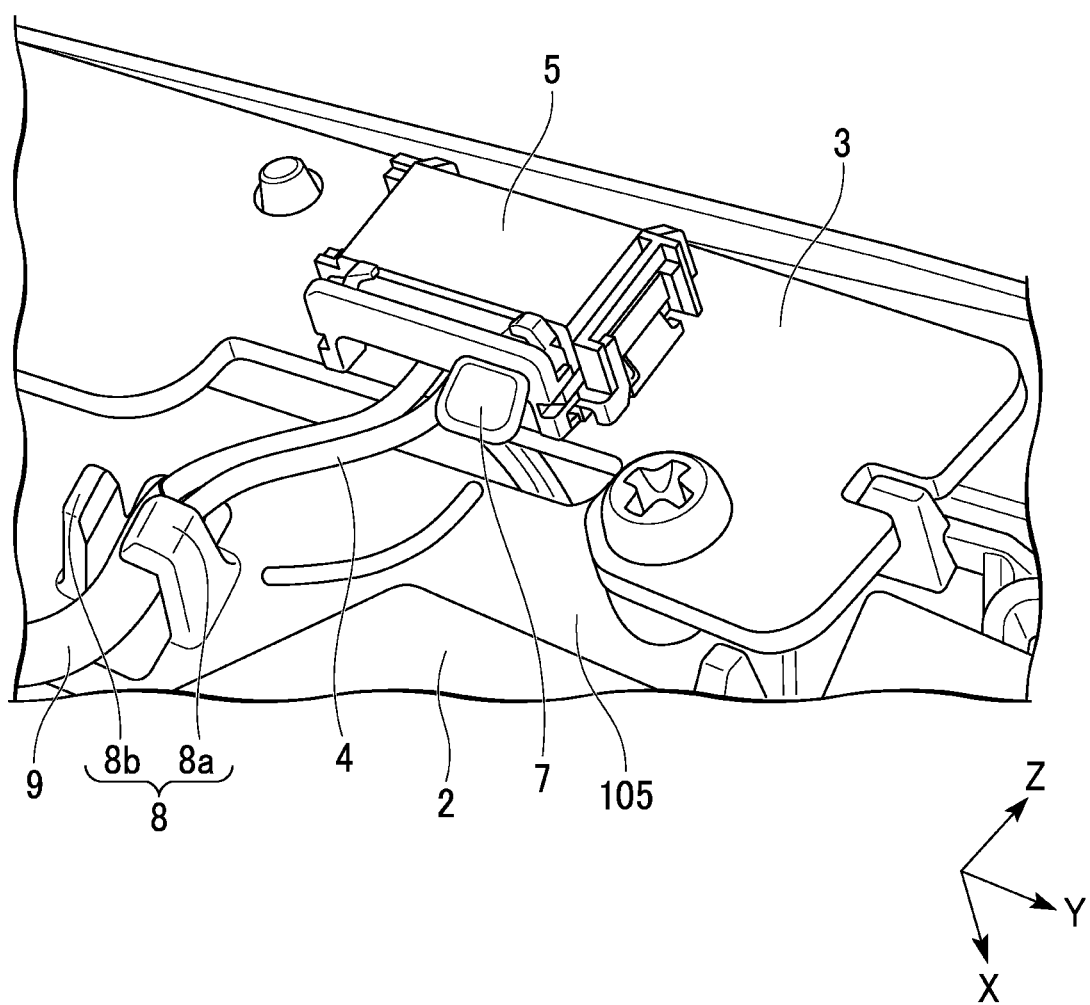
FIG. 2 is a partially enlarged perspective view of the vehicle lamp shown in FIG. 1.
Figure 3:
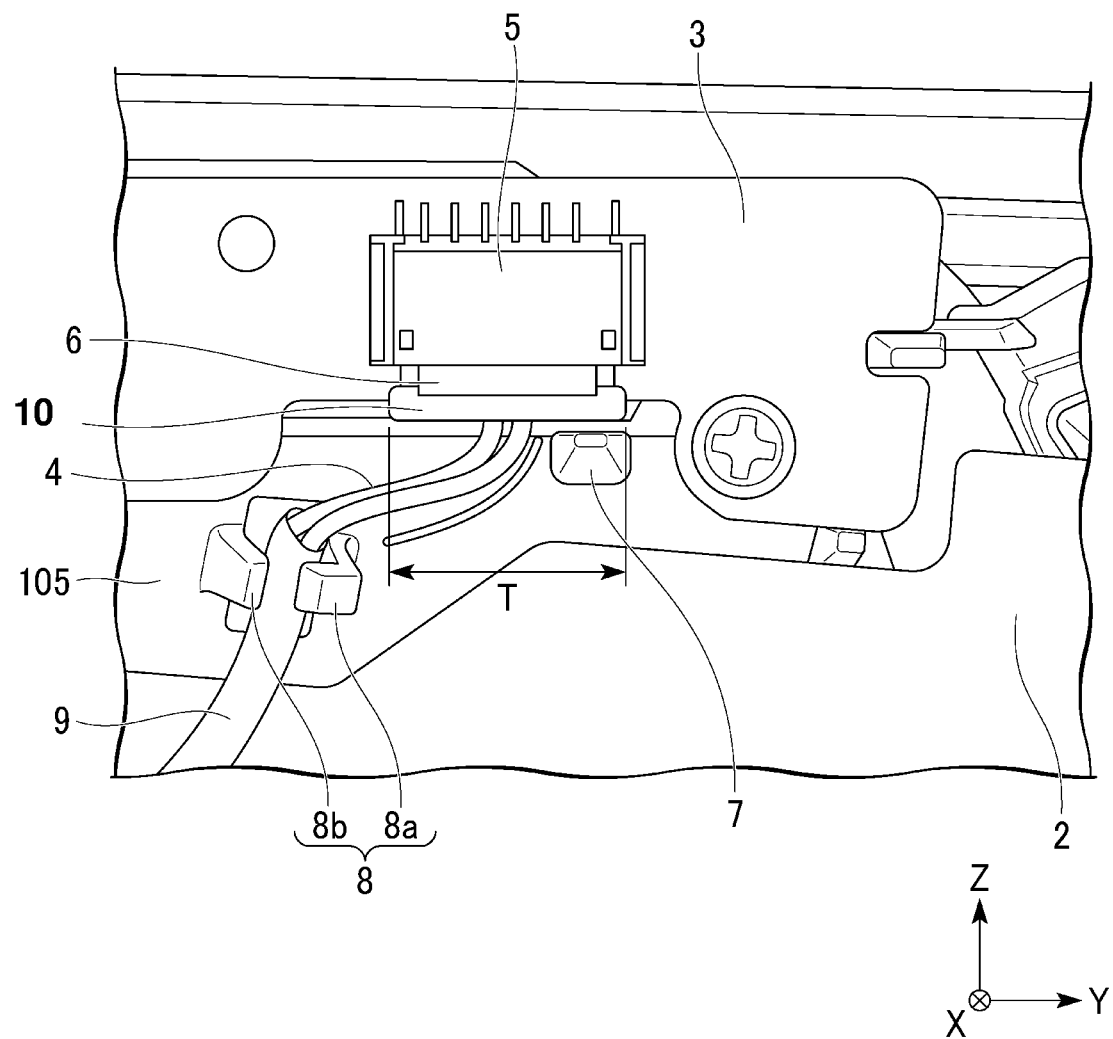
FIG. 3 is a partially enlarged plan view of the vehicle lamp shown in FIG. 1.
Figure 4:
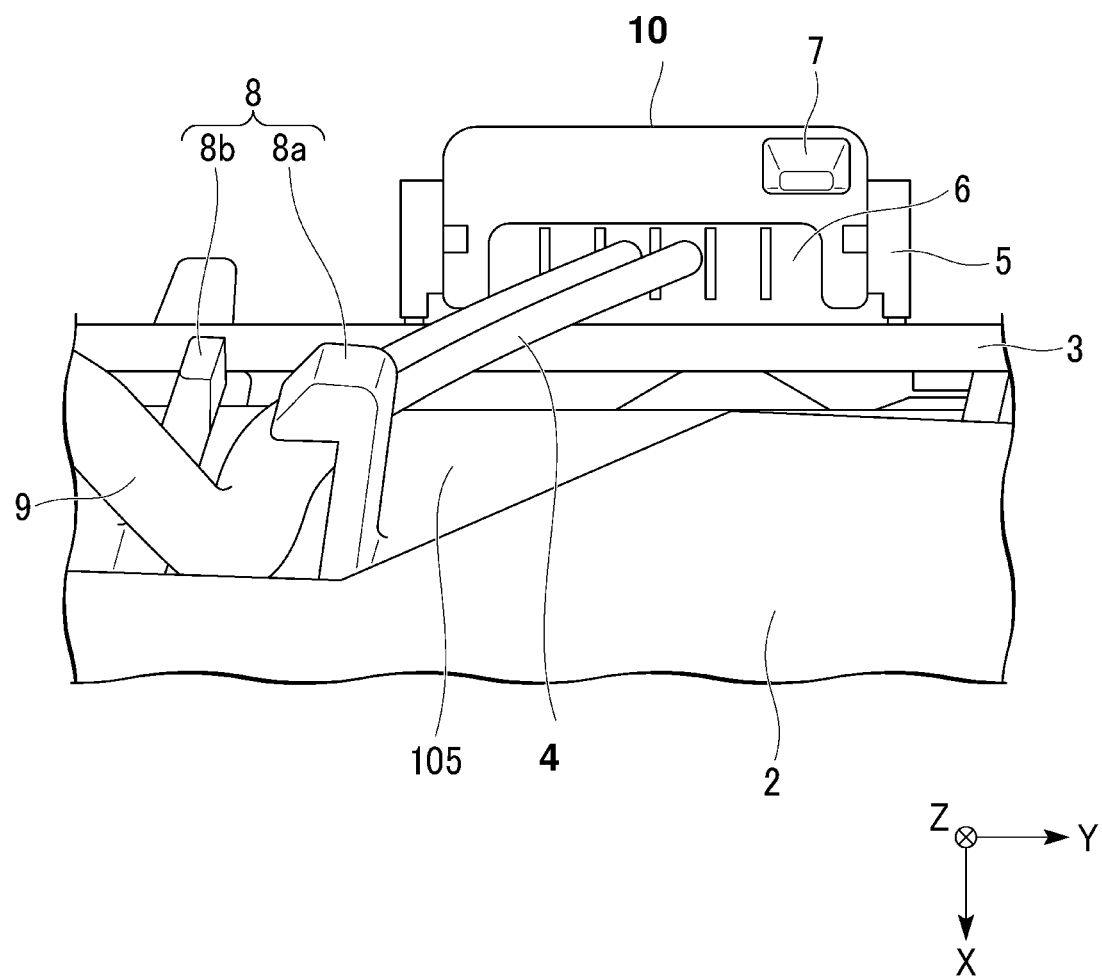
FIG. 4 is a partially enlarged rear view of the vehicle lamp shown in FIG. 1.

Further, FIG. 1 is a cross-sectional view showing a configuration of the lighting tool 1A for a vehicle. FIG. 2 is a partially enlarged perspective view of the lighting tool 1A for a vehicle. FIG. 3 is a partially enlarged plan view of the lighting tool 1A for a vehicle. FIG. 4 is a partially enlarged rear view of the lighting tool 1A for a vehicle.

In addition, in the following drawings, an XYZ orthogonal coordinate system is set, an X-axis direction indicates a forward/rearward direction (a lengthwise direction) with respect to the lighting tool 1A for a vehicle, a Y-axis direction indicates a leftward/rightward direction (a widthwise direction) with respect to the lighting tool 1A for a vehicle, and a Z-axis direction indicates an upward/downward direction (a height direction) with respect to the lighting tool 1A for a vehicle.

The lighting tool 1A for a vehicle of the embodiment is a lighting tool obtained by applying the present invention to a headlight (a headlamp) for a vehicle mounted on each of both corner sections on a front end side of a vehicle (not shown).

Further, directions of forward, rearward, leftward, rightward, upward and downward mean directions when viewing a front surface of the lighting tool 1A for a vehicle (from in front of the vehicle) described below unless the context clearly indicates otherwise.

Specifically, as shown in FIG. 1, the lighting tool 1A for a vehicle has a structure in which a light source unit 104 configured to radiate light forward (a +X-axis direction) is disposed inside a lighting body 103 constituted by a housing 101 having an open front surface and a transparent lens cover 102 that covers an opening of the housing 101.

In the light source unit 104, a light emitting diode (LED) configured to emit white light is used as a light source (not shown). In the light source unit 104, a mounting board 2 on which the LED is mounted and a circuit board 3 on which a driving circuit configured to drive the LED is provided are independently disposed inside a lighting body 102, the mount board 2 and the circuit board 3 are electrically connected via a wiring cord 4, and the driving circuit is protected from heat generated by the LED.

As shown in FIG. 2 and FIG. 3 partially enlarged, in the light source unit 104, electrical connection (conduction) between the female connector 5 and the male connector 6 is performed by inserting a male connector 6 attached to the wiring cord 4 into a female connector 5 attached to the circuit board 3.

The circuit board 3 is attached to a bracket 105 disposed inside the lighting body 103 using screws in a aligned state. In addition, an insertion direction of the male connector 6 into the female connector 5 is a direction (a +Z-axis direction) from a lower side toward an upper side of the lighting body 103.

As shown in FIG. 1 to FIG. 3, the housing 101 has a restricting section 7 that becomes a stopper of the male connector 6 at a position facing an end portion (a lower end portion) on a side opposite to the male connector 6 in the insertion direction (on a −Z axis side) in a state in which the male connector 6 is inserted into the female connector 5.

The restricting section 7 is a portion that abuts a lower end portion of the male connector 6 and restricts movement of the male connector 6 when the male connector 6 is moved in a direction (a −Z-axis direction) opposite to the insertion direction, and is constituted by a rib (a convex section) protruding from an inner surface of the housing 101. That is, the restricting section 7 is configured separately from the light source unit 104, and provided at a position facing a lower end portion of the male connector 6 of the housing 101 that constitutes the lighting body 103. In addition, the restricting section 7 is disposed separately from the lower end portion of the male connector 6 within a range in which electrical connection (conduction) between the female connector 5 and the male connector 6 is maintained.

The lighting tool 1A for a vehicle of the embodiment includes a clamp section 8 configured to hold (clamp) the wiring cord 4 such that the wiring cord 4 does not move due to vibrations, impacts, or the like, during traveling of the vehicle.

The clamp section 8 has a hook piece 8a and a straight piece 8b provided to protrude from the bracket 105, and is configured to hook the wiring cord 4 between the hook piece 8a and the straight piece 8b.

The wiring cord 4 is disposed while being bent between the male connector 6 and the clamp section 8. In the embodiment, the two wiring cords 4 are bound by a tube 9 that is a binding member. The clamp section 8 maintains a position in which the tube 9 is bound by the wiring cord 4. Accordingly, the wiring cord 4 bound by the tube 9 can be stably held by a clamp section 8 while protecting the wiring cord 4. In addition, the wiring cord 4 can be held while being bent from an opening end of the tube 9 toward the male connector 6. Further, the binding member may use tape or the like in addition to the above-mentioned tube 9.

The clamp section 8 is disposed below the male connector 6. In addition, the clamp section 8 is provided at a position offset to one side from a center of the male connector 6 in a direction (a Y-axis direction) perpendicular to the insertion direction of the male connector 6 into the female connector 5. In the embodiment, the clamp section 8 is provided at a position offset further outward than a range T which overlaps the male connector 6 in the insertion direction of the male connector 6 with respect to the female connector 5.

Figure 5:
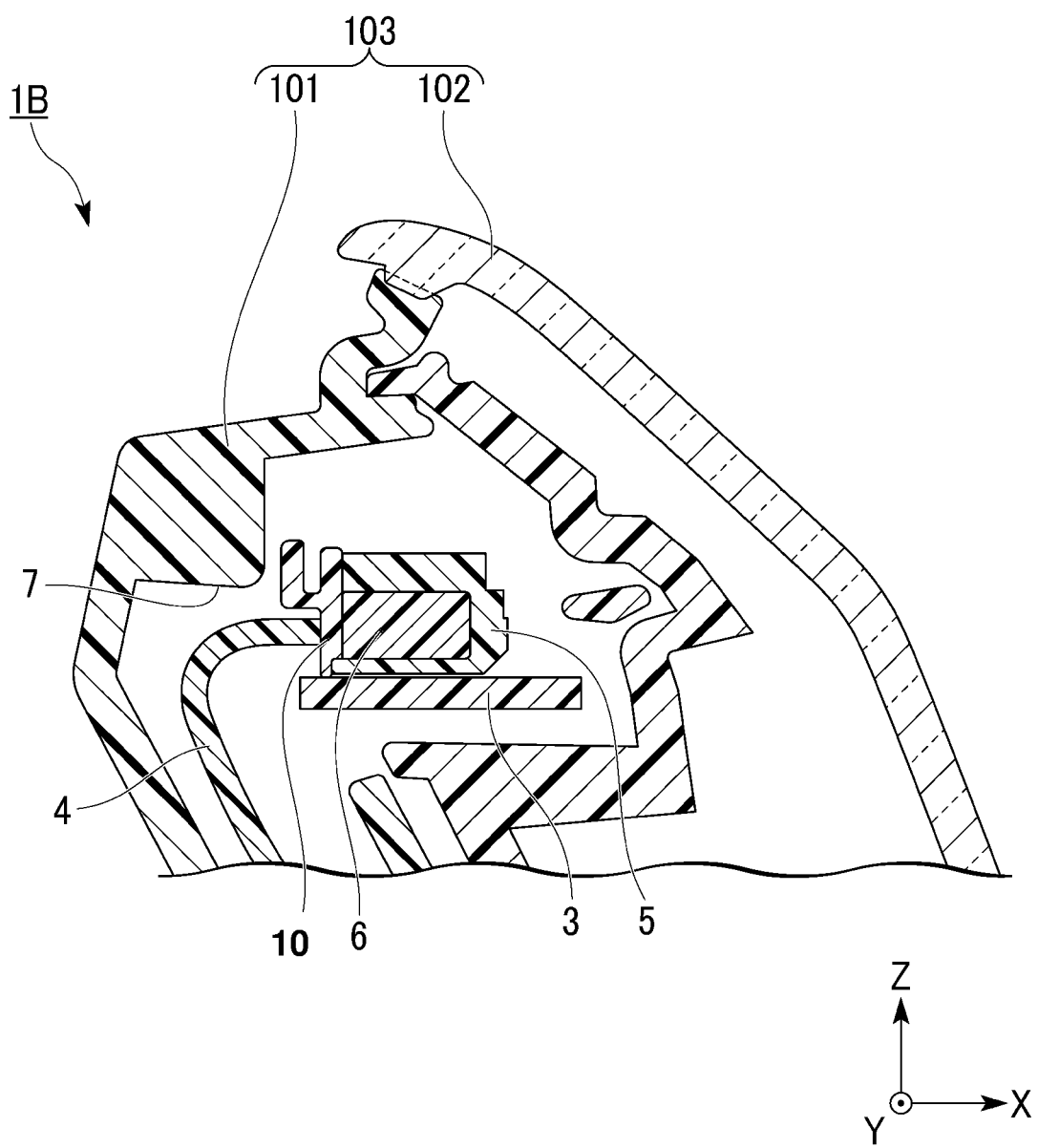
FIG. 5 is a cross-sectional view showing a configuration of a vehicle lamp according to a second embodiment of the present invention.

As shown in FIG. 3 to FIG. 5, the male connector 6 has a number of (in the embodiment, six) terminals (not shown)

which is greater than the number of (in the embodiment, two) wiring cords 4. The wiring cords 4 are electrically connected to the terminal located at a central section of the male connector 6 while being inserted from a central section of the male connector 6 on the side of the lower end.

In addition, the wiring cords 4 are held by a retainer 10 attached to the male connector 6 on the side of the lower end. The retainer 10 is attached to the male connector 6 to cover the side of the lower end. The restricting section 7 is disposed separately from the retainer 10 within a range in which electrical connection (conduction) between the female connector 5 and the male connector 6 is maintained. Further, a configuration from which the retainer 10 is omitted is possible.

Since tension in a direction in which the wiring cord 4 is bent is applied to the male connector 6 inserted into the female connector 5 from the wiring cord 4, the male connector 6 moves with respect to the wiring cord 4 in a direction in which the male connector 6 is removed from a side opposite to the side at which the wiring cord 4 is bent.

On the other hand, the restricting section 7 is provided so as to face the lower end portion of the male connector 6 which is disposed on a side opposite to the side the wiring cord 4 is bent with respect to the wiring cord 4. Accordingly, the restricting section 7 abuts the lower end portion (in the embodiment, the retainer 10) of the male connector 6 and restricts movement of the male connector 6 when the male connector 6 is moved in a direction opposite to the insertion direction.

As described above, in the lighting tool 1A for a vehicle of the embodiment, electrical connection (conduction) between the female connector 5 and the male connector 6 can be maintained while preventing the male connector 6 from dropping off from the female connector 5.

In addition, in the lighting tool 1A for a vehicle of the embodiment, the restricting section 7 is disposed separately from the lower end portion (the retainer 10) of the male connector 6 within a range in which electrical connection (conduction) between the female connector 5 and the male connector 6 is maintained. Accordingly, when vibrations, impacts, or the like, during traveling of the vehicle are applied to the restricting section 7, application of a load to the male connector 6 inserted into the female connector 5 or the attachment portion of the female connector 5 attached to the circuit board 3 can be prevented.

In addition, in the lighting tool 1A for a vehicle, since a large amount of vibrations, impacts, or the like, are applied in the upward/downward direction (the Z-axis direction) during traveling of the vehicle, when the insertion direction of the male connector 6 into the female connector 5 is a direction from a lower side toward an upper side of the lighting body 102, the male connector 6 is likely to fall out of the female connector 5.

On the other hand, in the lighting tool 1A for a vehicle of the embodiment, even when vibrations, impacts, or the like, during traveling of the vehicle are applied, since electrical connection (conduction) between the female connector 5 and the male connector 6 can be maintained, it is possible to prevent the LED from becoming unlit during traveling of the vehicle.

Second Embodiment

Next, for example, a lighting tool 1B for a vehicle shown in FIG. 5 will be described as a second embodiment of the present invention.

Further, FIG. 5 is a cross-sectional view showing a configuration of the lighting tool 1B for a vehicle. In addition, in the following description, components the same as those of the lighting tool 1A for a vehicle are designated by the same reference characters in the drawing and descriptions thereof will be omitted.

As shown in FIG. 5, an insertion direction of the male connector 6 into the female connector 5 in the lighting tool 1B for a vehicle of the embodiment is a direction (a +X-axis direction) which is directed from a back surface side toward a front surface side of the lighting body 103.

The restricting section 7 is provided to face a rear end portion of the male connector 6 inserted into the female connector 5 corresponding thereto. Accordingly, the restricting section 7 abuts the lower end portion (the retainer 10) of the male connector 6 and restricts movement of the male connector 6 when the male connector 6 is moved in a direction (a −X-axis direction) opposite to the insertion direction.

As described above, in the lighting tool 1B for a vehicle of the embodiment, electrical connection (conduction) between the female connector 5 and the male connector 6 can be maintained while preventing the male connector 6 from falling off from the female connector 5.

In addition, in the lighting tool 1B for a vehicle of the embodiment, the restricting section 7 is disposed separately from the rear end portion of the male connector 6 within a range in which electrical connection (conduction) between the female connector 5 and the male connector 6 is maintained. Accordingly, when vibrations, impacts, or the like, during traveling of the vehicle are applied to the restricting section 7, it is possible to prevent a load from being applied to the male connector 6 inserted into the female connector 5 or the attachment portion of the female connector 5 attached to the circuit board 3.

Further, the present invention is not necessarily limited to these embodiments, and various modifications may be made without departing from the scope of the present invention.

Figure 6A:
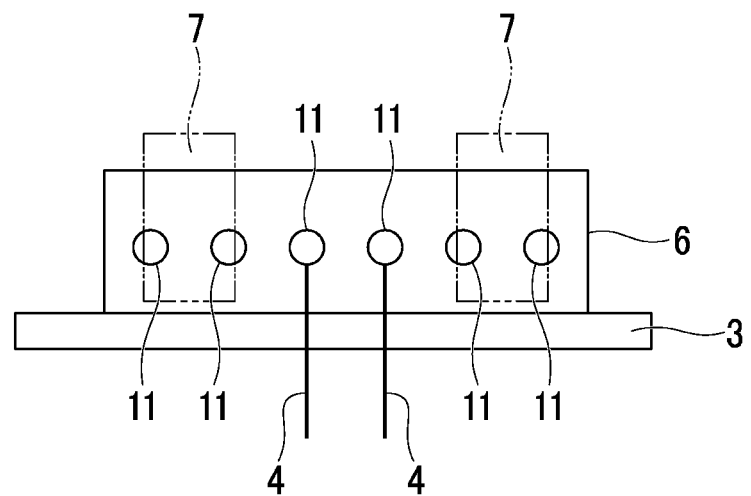
FIG. 6A is a rear view exemplifying a positional relation between a terminal of a male connector, a wiring cord and a restricting section.
Figure 6B:
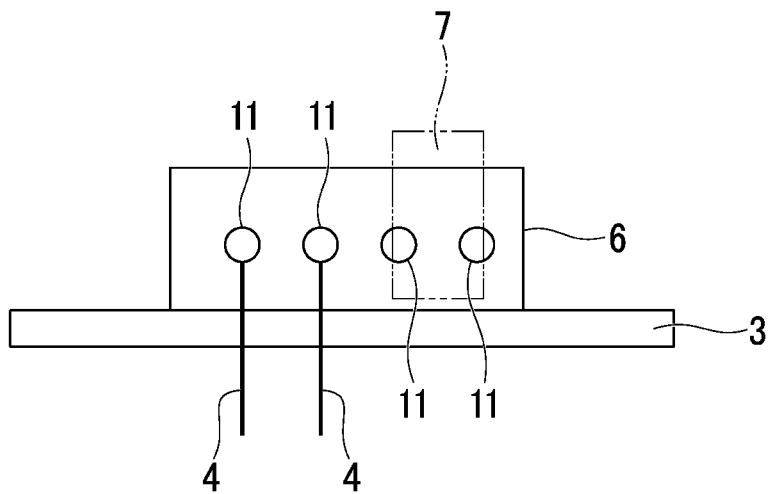
FIG. 6B is a rear view exemplifying a positional relation between a terminal of a male connector, a wiring cord and a restricting section.

For example, as shown in FIG. 6A and FIG. 6B, the male connector 6 has a larger number of terminals 11 than the number of wiring cords 4, and the restricting section 7 is preferably provided at a position facing the terminal 11 to which the wiring cord 4 of the male connector 6 is not connected. Further, FIG. 6A and FIG. 6B are rear views exemplifying positional relations between the terminals 11 of the male connector 6, the restricting section 7 and the wiring cord 4, and FIG. 6A shows a case of a 6-pole terminal, and FIG. 6B shows a case of a 4-pole terminal.

Accordingly, when the male connector 6 is moved in the direction opposite to the insertion direction to the end portion on the side opposite to the male connector 6 in the insertion direction, it is possible to provide a portion abutting the restricting section 7.

Further, while the configuration in which the male connector 6 is attached to the wiring cord 4 is provided in the embodiment, even when the female connector 5 is attached to the wiring cord 4 and the male connector 6 on the fixed side is inserted into the female connector 5, since the restricting section 7 that is a stopper of the female connector 5 is provided, electrical connection (conduction) between the male connector 6 and the female connector 5 can be maintained while preventing the female connector 5 from falling off from the male connector 6.

Further, the vehicle lamp to which the present invention is applied is not limited to the above-mentioned headlight (the headlamp) for a vehicle, and for example, the present invention may be widely applied to a vehicle lamp such as a width indicator (a position light), a subsidiary headlight (a sub headlamp), a front (rear) fog light (fog lamp), a daytime lighting (daytime running) light, a lid light, a tail lamp (tail light), a brake light (stopping light), a rear light, a direction indicator (a turn signal light), or the like.

In addition, for example, a light emitting element such as a laser diode (LD) or the like may be used in the light source unit 104 as a light source in addition to the above-mentioned LED. In addition, the color of light emitted by the light emitting element is not limited to the above-mentioned white light, and may be appropriately changed to red light, orange light, or the like, according to the use of the light source.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A vehicle lamp comprising a light source unit that is configured to radiate light forward and that is disposed inside of a lighting body which is constituted by a housing having an opened front surface and a lens cover that covers the opening of the housing, wherein
    the light source unit includes a circuit board to which a female connector is attached, and a wiring cord to which a male connector is attached, and
    the housing includes a restricting section that serves as a stopper of the male connector at a position facing an end portion of the male connector on a side opposite to the male connector in an insertion direction of the male connector in a state in which the male connector is inserted into the female connector.

2. The vehicle lamp according to claim 1, wherein the restricting section is a portion that abuts the end portion of the male connector and restricts movement of the male connector when the male connector is moved in a direction opposite to the insertion direction, and the restricting section is separately disposed from the end portion of the male connector within a range in which electrical connection between the female connector and the male connector is maintained.

3. The vehicle lamp according to claim 2, comprising a retainer that is attached to an end portion of the male connector at an opposite side of the insertion direction of the male connector, and
    the restricting section is separately disposed from the retainer within a range in which electrical connection between the female connector and the male connector is maintained.

4. The vehicle lamp according to claim 1, wherein the male connector has a larger number of terminals than a number of the wiring cords, and
    the restricting section is provided at a position facing a terminal at which it is not connected to the wiring cord of the male connector.

5. The vehicle lamp according to claim 1, comprising a bracket disposed inside the lighting body,
    wherein the bracket has a clamp section that holds the wiring cord,
    the wiring cord is disposed while being bent between the male connector and the clamp section, and
    the restricting section is disposed with respect to the wiring cord at a side opposite to a side at which the wiring cord is bent.

6. The vehicle lamp according to claim 5, comprising a binding member configured to bind the wiring cords, and
    the clamp section maintains a position of the wiring cord bound by the binding member.

7. The vehicle lamp according claim 1, wherein the insertion direction of the male connector is a direction from a lower side toward an upper side of the lighting body.

* * * * *